(12) United States Patent
Brandenbusch et al.

(10) Patent No.: US 10,343,130 B2
(45) Date of Patent: Jul. 9, 2019

(54) METHOD FOR PROCESSING OF STABLE EMULSIONS FROM WHOLE-CELL BIOTRANSFORMATIONS BY MEANS OF PHASE INVERSION

(71) Applicant: Technische Universitaet Dortmund, Dortmund (DE)

(72) Inventors: Christoph Brandenbusch, Essen (DE); Gabriele Sadowski, Dortmund (DE); Bruno Buehler, Dortmund (DE); Jonathan A. Collins, Amherst, MA (US)

(73) Assignee: Technische Universitaet Dortmund, Dortmund (DE)

( * ) Notice: Subject to any disclaimer, the term of this patent is extended or adjusted under 35 U.S.C. 154(b) by 692 days.

(21) Appl. No.: 14/533,278

(22) Filed: Nov. 5, 2014

(65) Prior Publication Data

US 2015/0125931 A1 May 7, 2015

(30) Foreign Application Priority Data

Nov. 6, 2013 (EP) .................................... 13005234

(51) Int. Cl.
*B01D 17/04* (2006.01)
*B01J 13/00* (2006.01)

(52) U.S. Cl.
CPC .............. *B01J 13/00* (2013.01); *B01D 17/04* (2013.01)

(58) Field of Classification Search
CPC ................................. B01J 13/00; B01D 17/04
USPC .......................... 210/708, 712, 713, 738, 805
See application file for complete search history.

(56) References Cited

U.S. PATENT DOCUMENTS

| 3,928,194 A | 12/1975 | Tao |
| 5,334,317 A | 8/1994 | Bannach Sichtermann et al. |
| 5,772,901 A | 6/1998 | Yu et al. |
| 8,431,358 B2 | 4/2013 | Sadowski et al. |

FOREIGN PATENT DOCUMENTS

DE 10 2007 034 258 A1 1/2009

OTHER PUBLICATIONS

Dunstan et al., "High Internal Phase Emulsions: Catastrophic Phase Inversion, Stability, and Triggered Destabilization," Langmuir, 2012, 28, pp. 339-349.
León et al., "Whole-cell biocatalysis in organic media," Enzyme and Microbial Technology 23, 1998, pp. 483-500.
Lilly, M. D., "Two-liquid-phase Biocatalytic Reactions," J. Chem. Tech. Biotechnol. 1982, 32.
Nikolova et al., "Whole cell biocatalysis in nonconventional media," Journal of Industrial Microbiology, 12 (1993), pp. 76-86.
Salter et al., "Solvent Selection from Whole Cell Biotransformations in Organic Media," Critical Reviews in Biotechnology, 15(2), 1995, pp. 139-177.
Bühler et al., "Process implementation aspects for biocatalytic hydrocarbon oxyfunctionalization," Journal of Biotechnology, 113 (2004), pp. 183-210.
Van Sonsbeek et al., "Two-liquid-phase bioreactors," Enzyme Microb. Technol., 1993, vol. 15, pp. 722-729.
Kollmer, Andreas, "Verfahrenstechnische Aspekte bei zweiphasigen Bioprozessen," Diss. ETH Nr. 12491, (1997), total of 112 pages.
Mathys, Renata Gabriela, "Bioconversion in Two-liquid Phase Systems: Downstream Processing," Diss. ETH No. 12013, (1997), total of 92 pages.
Schmid, Andrew, "Two-Liquid Phase Bioprocess Development, Interfacial Mass Transfer Rates and Explosion Safety," Diss. ETH No. 12346, (1997), total of 114 pages.
Yeo et al., "Supercritical Extraction of Organic Mixtures from Aqueous Solutions," AIChE Journal, vol. 36, No. 11, Nov. 1990, pp. 1743-1747.
Zaki et al., "A Novel Process for Demulsification of Water-in-Crude Oil Emulsions by Dense Carbon Dioxide," Ind. Eng. Chem. Res., 2003, pp. 6661-6672.
Lilly, M. D., "Two-liquid-phase Biocatalytic Reactions," J. Chem. Tech. Biotechnol. 1982, 32, pp. 162-169.
European Examination Report in EP 13005234.3-1351, dated Apr. 1, 2014.
European Search Report in EP 13005234, dated Mar. 25, 2014.
Entry of "Emulsion" from German Wikipedia, downloaded on Jun. 8, 2017 from https://de.wikipedia.org/wiki/Emulsion; computer-generated English translation obtained on Jun. 12, 2017.

*Primary Examiner* — Allison M Fox
(74) *Attorney, Agent, or Firm* — Collard & Roe, P.C.

(57) ABSTRACT

A method processes a stable emulsion having components from whole-cell biotransformations such as cells, soluble cell components, organic solvents and/or water. In this connection, the emulsion, which is stable after the biotransformation, is mixed with further parts of organic phase, and subsequently the mixture is continuously stirred until a catastrophic phase inversion of the emulsion takes place while mixing; subsequently, this phase-inverted mixture is transferred to a settling container, where the phases of the emulsion separate from one another and can be separated from one another.

18 Claims, 4 Drawing Sheets

METHOD FOR PROCESSING OF STABLE EMULSIONS FROM WHOLE-CELL BIOTRANSFORMATIONS BY MEANS OF PHASE INVERSION

CROSS REFERENCE TO RELATED APPLICATIONS

Applicant claims priority under 35 U.S.C. § 119 of European Application No. 13 005 234.3 filed Nov. 6, 2013, the disclosure of which is incorporated by reference.

BACKGROUND OF THE INVENTION

1. Field of the Invention

The invention relates to a method for processing of stable emulsions from whole-cell biotransformations.

2. Description of the Related Art

An aqueous-organic two-phase system is frequently used for biocatalytic conversion of a polar organic molecules [1-5]. This system allows the use and the accumulation of high concentrations of substrates and products having poor solubility in water. The organic phase, consisting of an a polar, non-toxic solvent or of a mixture of multiple solvents, serves as a substrate reservoir and/or as a product sink. Furthermore, the organic phase protects against toxic effects of substrates and products on the biocatalyst.

Furthermore, the characteristic distribution of substrates and products in the two phases can be utilized to prevent kinetic product inhibition, to steer equilibrium reactions into the desired direction, to increase enantioselectivity, and to monitor multi-step reactions.

Typically, such two-phase systems are strongly emulsified in order to achieve high mass transfer rates. The formation of stable emulsions is also promoted by high biocatalyst concentrations, especially if whole microbial cells are used. In this connection, high concentrations of macromolecular surfactant substances (cells, lipids, proteins, polysaccharides, biosurfactants, cell fragments) occur [6-9].

Because, in the case of two-phase bioprocesses, not only product isolation but also solvent recycling is essential for economic and ecological reasons, the two phases must be separated from one another after the biotransformation. This phase separation has proven to be difficult in the case of stable emulsions such as those that occur when using whole microbial cells. Various methods for phase separation, such as centrifugation, membrane filtration, filter coalescence, addition of demulsifiers or thermal methods yielded unsatisfactory results or were very complicated in terms of apparatus and time [7]. Complicated phase separation is considered a main limitation of industrial implementation of two-phase bioprocesses, with their great economic and ecological potential. In the sector of phase separation in the case of two-phase whole-cell biotransformations, there is therefore a need for innovation.

Typically, the systems from the biotransformation are at first roughly separated by means of centrifugation. Subsequently, multiple filtrations and (ultra)centrifugation steps are carried out, in order to achieve sufficient separation. The organic phase obtained in this very complicated manner is subsequently subjected to distillative or extractive processing, in order to separate out the valuable product. (In this connection, however, it is not possible to achieve adequate phase separation. Therefore it is not possible to separate the organic phase, which contains the valuable product, completely from the aqueous phase. This inability makes further processing significantly more difficult).

In the case of other separation methods, an attempt is made to purify the emulsion by means of distillation, after rough mechanical separation of other components, whereby problems occur due to fouling and two-phase states in the column. In the case of an enzymatic method, the emulsion is separated, with good results, by means of the use of hydrolases. Except for the method last mentioned, all previous methods are unable to achieve defined phase separation. Complete separation of not only the cells/cell components but also of the aqueous phase from the organic phase has not been possible until now.

Separation of the cell mass is of great importance in this connection, because this mass can lead to encrustations or blockages during subsequent process steps. Furthermore, no permanent separation of the phases can be achieved with the alternative solution approaches described. Aside from the great number of purification steps, another disadvantage of the previous methods is the use of a solvent for extraction, which might be required. Such solvent would have to be subsequently recovered.

The separation of aqueous-organic two-phase systems being discussed here will be described below, as an example, using the separation of coalescence-inhibited emulsions from two-phase whole-cell biotransformations, for example in a polar solvents. The reaction mixture present in this connection, after biotransformation has taken place, does not separate spontaneously and is present essentially as shown in FIG. 1, after it has been allowed to stand for a longer period of time. The mixture optically consists of three phases, whereby a milky, organic/aqueous emulsion forms the upper phase (I), which contains not only the organic solvent but also the educt, byproducts, and the product. Furthermore, this emulsion also contains dissolved components and surfactant substances (salts, nutrients, lipids, proteins, polysaccharides, biosurfactants, cells). The second optically identifiable phase (II) is an aqueous phase in which the nutrients required for cultivation (which are partly still present in the emulsion) are situated and from which the cells/biomass (III) settle in a third phase.

The complexity of the present reaction mixture becomes even clearer when one attempts to separate the two-phase system by means of conventional methods such as centrifugation. Thus, after extended centrifugation, the appearance shown in FIG. 2 is obtained. After extended centrifugation of the mixture from FIG. 1, the influence of the macromolecular surfactant substances present in the emulsion (lipids, proteins, polysaccharides, biosurfactants, cells, cell fragments) is clearly evident. Although the cells contained in the aqueous phase settle at the bottom of the vessel (IV), and the aqueous phase (III) has a sharp upper phase boundary surface, only insufficient separation into an organic phase (I) and an interphase or emulsion phase (II) can be observed in the emulsion (Phase I in FIG. 1).

A method for processing of a coalescence-inhibited emulsion having components from whole-cell biotransformations such as cells, soluble cell components, organic solvents and/or water is known from DE 10 2007 034 258 A1. In this method, the stable, coalescence-inhibited emulsion obtained after biotransformation is placed into a container with carbon dioxide in excess, and mixed for a predetermined period of time, at elevated pressure and elevated temperatures, whereupon the aqueous phase and the organic phase of the emulsion separate from one another, and the cells and cell components of both the aqueous phase and the organic phase precipitate in the region of their boundary surfaces or phase boundary surfaces, and are subsequently separated.

After the addition of carbon dioxide, preferably in excess (for example of about 3 mass parts of compressed carbon dioxide per mass part of emulsion) and preferably under a pressure of about 115 bar, for example, and at a temperature of about 45° C., for example, the emulsion is intensively mixed with the carbon dioxide, preferably for 2 minutes. The higher the temperature used here that is selected, the higher the pressure that should also be selected.

After the mixer is turned off, a sharp separation of the aqueous phase and the organic phase is subsequently observed. As a result, the cell components precipitate at the boundary surfaces of the phases (perhaps also at a boundary surface to a container or the like) both at the lower end of the aqueous phase and of the organic phase. These cell components can now simply be removed, because in contrast to the original emulsion, they sediment more rapidly. Even after the pressure is relaxed, the phases rapidly separate from one another even after they are mixed again repeatedly. The organic phase, which contains the valuable product, can subsequently be processed efficiently, for example by means of hypercritical extraction. A disadvantage of this method, however, is the relatively great effort in terms of equipment technology, because high-pressure equipment is required.

SUMMARY OF THE INVENTION

It is therefore an object of the present invention to provide a method with which components of stable emulsions from whole-cell biotransformations can be easily separated from one another.

These and other objects are achieved by a method for processing of a stable emulsion, having components from whole-cell biotransformations such as cells, soluble cell components, organic solvents and/or water according to the invention. Further advantageous embodiments of the invention are discussed below.

The invention provides a method for processing of a stable emulsion, having components from whole-cell biotransformations such as cells, soluble cell components, organic solvents and/or water. In this method, the emulsion, which is stable after the biotransformation, is mixed with further parts of dispersed phase, and subsequently the mixture is continuously stirred until a catastrophic phase inversion of the emulsion takes place while mixing; subsequently, this phase-inverted mixture is transferred to a settling container, where the phases of the emulsion separate from one another and can be separated from one another. The core idea of the invention is the utilization of the effect of catastrophic phase inversion, in which the oil-in-water emulsion that was originally present is converted to a water-in oil emulsion, or the water-in-oil emulsion is converted to an oil-in-water emulsion, and thereby completely changed conditions for the subsequent separation of the aqueous phase and the dispersed phase of the originally stable emulsion can be produced. As a result of these changed conditions, when the mixture of the originally stable emulsion and the added dispersed phase is extracted, separation of the components of the emulsion can be easily achieved or easily takes place, for example by placing this mixture into a settling container.

In the method according to the invention, it is primarily important to ensure that the prerequisites for catastrophic phase inversion of the mixture of this type are created by means of adding dispersed phase and, particularly advantageously, organic phase as a dispersed phase to the originally stable emulsion. In this connection, the process of catastrophic phase inversion is actually known, and does not need to be explained in further detail here. The theory in this regard can be derived, for example, from T. S. Duncan et al., "High Internal Phase Emulsions: Catastrophic Phase Inversion, Stability, and Triggered Destabilization," ACS, Langmuir, 28, p. 339-349 (2012). Such applications of catastrophic phase inversion, however, have not been used for separation of traditional surfactant-stabilized or particle-stabilized emulsions up to the present time. Rather, attempts are specifically made to prevent precisely this behavior in the formation of emulsions and, for example, ointments.

The method according to the invention offers enormous potential for separating emulsions derived from biocatalytic processes, and for processing them with less effort in terms of apparatus and costs. In comparison with the method according to DE 10 2007 034 258 A1, it is possible to do without the use of high-pressure technology.

It is furthermore particularly advantageous that the phase ratio of stable emulsion and dispersed phase added to it can be changed in order to achieve the catastrophic phase inversion, as a function of the type and concentration of the cells from the biotransformation present in the stable emulsion. In this way, it can always be ensured, using slight adaptations to different stable emulsions and the reaction products from whole-cell biotransformations present in them, that the process of catastrophic phase inversion reliably takes place and therefore the prerequisites for subsequent separation of the components are met. Also, variations in the composition of the stable emulsion, for example, or also of the dispersed phase, can be easily balanced out by means of changes in the phase ratio of stable emulsion and dispersed phase added to it.

In particularly preferred manner, the phase ratio of stable emulsion and dispersed phase added to it can be adjusted, in order to achieve catastrophic phase inversion, between 1 part emulsion and 1 part dispersed phase, up to 1 part emulsion and 8 parts dispersed phase. In this connection, the precise point of catastrophic phase inversion is greatly dependent on the type and concentration of the biocatalysts, in other words the cells. In this sense, the concentration of *E. coli* strains, *Pseudomonades* or *Pseudomonas* strains, yeasts, fungi, etc., or also supports of immobilized enzymes, can be viewed as the concentration of the biocatalysts, and these substances can be utilized in the method according to the invention.

Particularly preferably, the emulsion, which is stable after biotransformation, is mixed with 4 to 5, preferably with 4 parts dispersed phase, for which purpose Bis 2-Ethylhexyl phthalate (BEHP) can be used as an organic solvent and *E. coli* can be used as a biocatalyst, for example, as components of the stable emulsion. Other compositions of the stable emulsion require other phase ratios. For example with ethyl oleate as the organic solvent and *E. coli* as the biocatalyst, a phase ratio of approximately 4:1 may be required, or, with ethyl oleate as the organic solvent and *Pseudomonas* as the biocatalyst, a phase ratio of approximately 6:1 may be required, or, with dodecanol as the organic solvent and *Pseudomonas* as the biocatalyst, a phase ratio of approximately 5:1 may be required. These examples are intended only as some information concerning a plurality of further possible compositions of emulsions from whole-cell biotransformations and required phase ratios, given as examples.

It is particularly advantageous that sharp phase separation forms in the settling container, in the emulsion mixed with added parts of dispersed phase, preferably while stirring moderately. This sharp phase separation takes place automatically, to a great extent, and does not require any further effort in terms of apparatus, with the exception of reasonable stirring.

It is particularly advantageous that the dispersed phase added to the stable emulsion can be recycled from previous purification steps. In this way, for one thing a type of self-supplying circulation system is possible, which requires the use of fresh dispersed phase, in each instance, to only a slight extent. The process can therefore be carried out in very cost-advantageous manner. For another thing, particularly when the reaction is being shut down, it is possible to make use of remaining dispersed phase from separations that occurred previously.

Furthermore, it is particularly advantageous that the dispersed phase, drawn off at the upper end of the settling container, is partly recycled, particularly 4 to 5 parts of this phase, for mixing it with newly supplied stable emulsion. In this way, only a small amount of fresh dispersed phase is needed to reliably keep the process of catastrophic phase inversion going. Also, because of the recycling of the dispersed phase in the ratio indicated above, no dilution of the dispersed phase occurs, and therefore the concentration of the product obtained is not reduced.

In a further embodiment, the organic phase drawn off at the upper end of the settling container can be passed in part, preferably 1 to 5 parts of this phase, to further purification for isolation of the valuable substance from the dispersed phase. From this proportion, the desired valuable substance can be obtained in that known separation and purification methods are used.

Furthermore, it is advantageous that the phase-inverted mixture is continuously transferred to the settling container, until the settling container is full. For actual removal by withdrawal of the dispersed phase and of the aqueous phase from the settling container, in this connection the feed of emulsion and dispersed phase into the mixing container can temporarily be switched to the recycling described. In this way, during drawing off, no contaminants or undesirable mixing of the components of the dispersed phase and of the aqueous phase can occur any longer. This feature particularly improves the degree of purity of the dispersed phase drawn off at the upper end of the settling container.

BRIEF DESCRIPTION OF THE DRAWINGS

Other objects and features of the invention will become apparent from the following detailed description considered in conjunction with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 2:
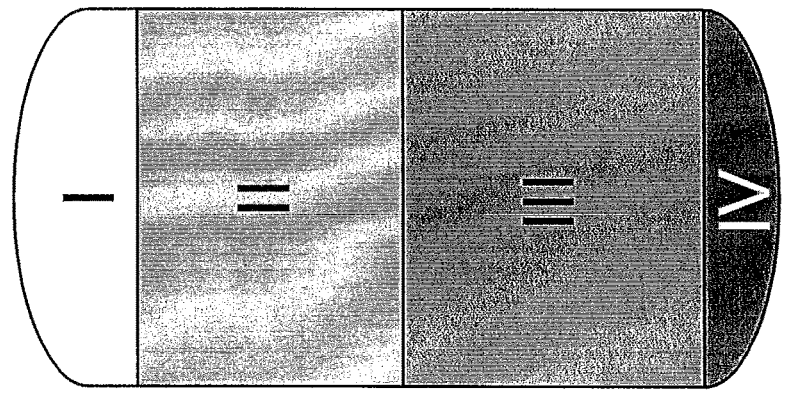
FIG. 2 shows a typical arrangement of the phases in a reaction mixture according to FIG. 1 after extended centrifugation.
Figure 1:
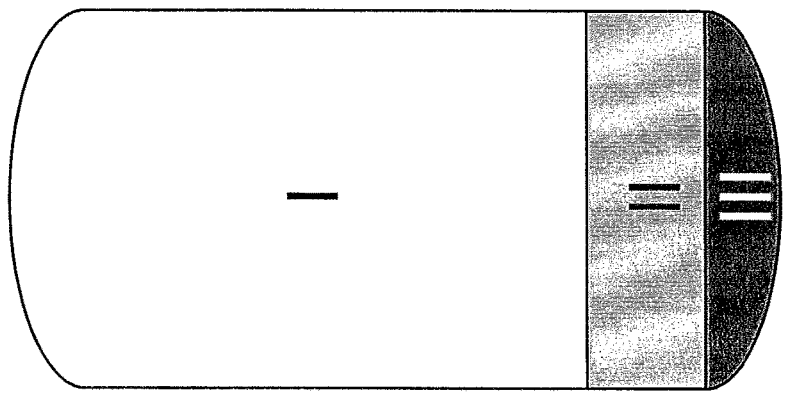
FIG. 1 shows a typical arrangement of the phases in a reaction mixture after biotransformation and after settling, without the use of the method according to the invention.
Figure 3:
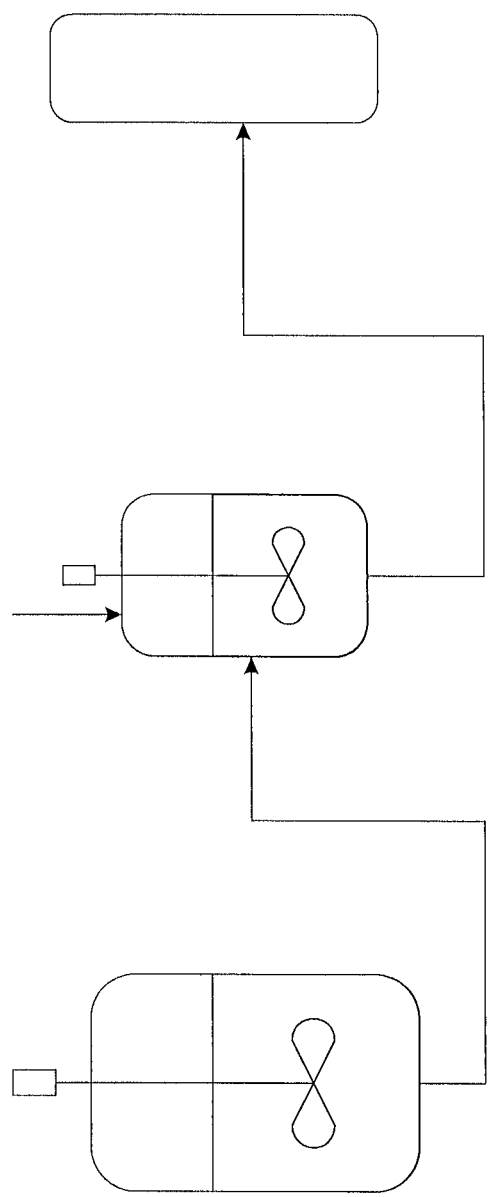
FIG. 3 shows a preferred embodiment of an apparatus for carrying out the method according to the invention for separation of the stable emulsion at the beginning of the method sequence according to the invention, when mixing stable emulsion and organic phase, as a preferred example of a dispersed phase in a mixer.

At the beginning of the method according to the invention, according to FIG. 3, part of a stable emulsion derived from whole-cell biotransformation, consisting of cells, soluble cell components, organic solvent, and water, is presented from a storage container into a downstream mixer, in a ratio of 1:1. In this mixer, this emulsion is then mixed with additional organic phase as a preferred example for a dispersed phase, for example from a separation that took place previously, in terms of time, so that a ratio of 5:1 (organic phase to aqueous phase), for example, occurs in the mixer. The mixture is then continuously stirred in the mixing vessel.

Figure 4:
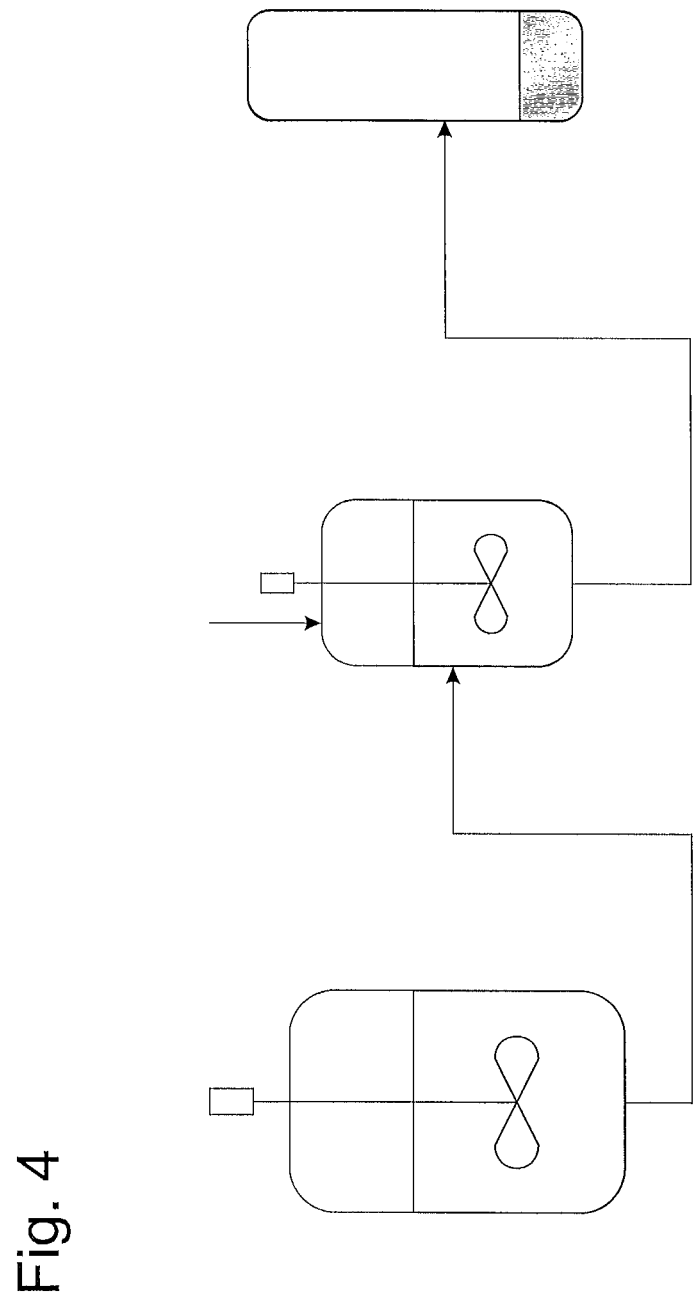
FIG. 4 shows another method step of the method according to the invention, according to FIG. 3, in which phase separation after catastrophic phase inversion has already taken place in the settler that follows the mixer.

In this state, what is called catastrophic phase inversion takes place in the mixing vessels, in the mixture of the emulsion that was stable until then and the additional organic phase, during which inversion the oil-in-water emulsion originally present is converted to a water-in-oil emulsion. During continuous transfer of this phase-inverted emulsion into a downstream settler, separation of this mixture into a component of organic phase and a component of aqueous phase will then occur essentially automatically, as indicated in FIG. 4, whereby sharp phase separation of the emulsion comes about, for example while stirring moderately. In this connection, the organic phase contains the valuable substance being sought, and the aqueous phase can be taken out and disposed of, if necessary.

At the same time, original emulsion from the storage container (1 part aqueous phase, 1 part organic phase) and organic phase from the last separation (for example, as shown, 4 parts) continuously flow into the mixer. This method of operation is maintained until the settler has been filled. The phase separation between aqueous phase and organic phase occurs while the settler is being filled, and does not require any separate waiting time.

Figure 5:
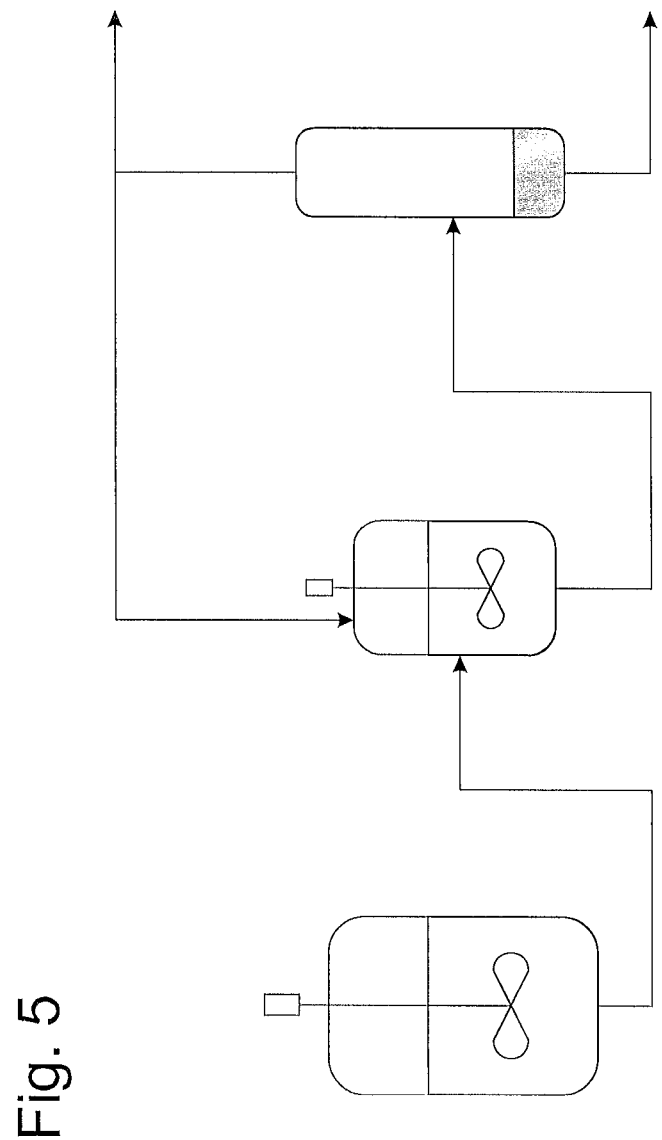
FIG. 5 shows a further method step of the method according to the invention according to FIG. 3, in which the organic and aqueous substances separated in the settler are drawn off for further processing/purification.

After the settler has been filled, the inflow of organic phase from the last separation into the mixer is stopped, according to FIG. 5. The organic phase is now removed at the head of the settler. From this organic phase, 4 parts are recycled into the mixer, in order to adjust the phase ratio required there to guarantee the catastrophic phase inversion. 1 part of the organic phase can be removed directly as the product of the phase separation, and passed on to further purification or processing stages, for example, not shown. The aqueous phase with the cells contained in it is drawn off at the sump of the settler and passed to disposal.

The phase ratio does not need to be maintained precisely. As soon as a critical amount has been reached, it can also be slightly exceeded (6:1 works in place of 5:1, as well). In this connection, the point of inversion depends greatly on the type and concentration of the biocatalysts (cells).

Some systems of solvent and emulsions from biocatalytic processes, investigated as examples, are shown below:

| Organic solvent | Biocatalyst | Phase ratio |
|---|---|---|
| BEHP | E. coli | approx. 5:1 |
| Ethyl oleate | E. coli | approx. 4:1 |
| Ethyl oleate | Pseudomonas | approx. 6:1 |
| Dodecanol | Pseudomonas | approx. 5:1 |

In this connection, the method according to the invention offers enormous potential for separating emulsions from biocatalytic processes (such as, for example, whole-cell biotransformations using microorganisms as catalysts) and processing them with little apparatus effort and in cost-advantageous manner. In this connection, great efficiency can be achieved in further method steps by catastrophic phase inversion.

Although only at least one embodiment of the present invention has been shown and described, it is to be understood that many changes and modifications may be made thereunto without departing from the spirit and scope of the invention.

REFERENCES

[1] R. Leon, P. Fernandes, H. M. Pinheiro, and J. M. S. Cabral, "Whole-cell biocatalysis in organic media," *Enzyme and Microbial Technology*, vol. 23, pp. 483-500, Dec. 15, 1998.

[2] M. D. Lilly, "Two-liquid-phase biocatalytic reactions," *Journal of Chemical Technology and Biotechnology*, vol. 32, pp. 162-169, 1982.

[3] P. Nikolova and O. P. Ward, "Whole cell biocatalysis in nonconventional media," *Journal of Industrial Microbiology*, vol. 12, pp. 76-86, February 1993.

[4] G. J. Salter and D. B. Kell, "Solvent selection for whole-cell biotransformations in organic media," *Critical Reviews in Biotechnology*, vol. 15, pp. 139-177, 1995.

[5] B. Bühler and A. Schmid, "Process implementation aspects for biocatalytic hydrocarbon oxyfunctionalization," *Journal of Biotechnology*, vol. 113, pp. 183-210, Sep. 30, 2004.

[6] H. M. Van Sonsbeek, H. H. Beeftink, and J. Tramper, "Two-liquid-phase bioreactors," *Enzyme and Microbial Technology*, vol. 15, pp. 722-729, September 1993.

[7] A. Kollmer, "Verfahrenstechnische Aspekte bei zweiphasigen Bioprozessen," in *Institute of Biotechnolgy* Zurich: Swiss Federal Institute of Technology, 1997, p. 202.

[8] R. G. Mathys, "Bioconversion in two-liquid phase systems: downstream processing," in *Institute of Biotechnolgy* Zurich: Swiss Federal Institute of Technology, 1997, p. 174.

[9] A. Schmid, "Two-liquid phase bioprocess development. Interfacial mass transfer reates and explosion safety," in *Institute of Biotechnolgy* Zurich: Swiss Federal Institute of Technology, 1997.

[10] S. D. Yeo and A. Akgerman, "Supercritical Extraction of Organic Mixtures from Aqueous-Solutions," *Aiche Journal*, vol. 36, pp. 1743-1747, November 1990.

[11] N. N. Zaki, R. G. Carbonell, and P. K. Kilpatrick, "A novel process for demulsification of water-in-crude oil emulsions by dense carbon dioxide," *Industrial & Engineering Chemistry Research*, vol. 42, pp. 6661-6672, Dec. 10, 2003.

What is claimed is:

1. A method for processing of a stable emulsion having components from a whole-cell biotransformation comprising:
   a) providing a stable emulsion having at least one dispersed phase and at least one continuous phase, wherein at least one product is present in the dispersed phase;
   b) forming a mixture by mixing the emulsion with further parts of the dispersed phase;
   c) subsequently continuously stirring the mixture until a catastrophic phase inversion of the emulsion takes place while mixing to form a phase-inverted mixture; and
   d) subsequently transferring the phase-inverted mixture to a settling container where the phases of the emulsion separate from one another and can be removed from one another;
   wherein the dispersed phase added to the stable emulsion is recycled from previous purification steps such that the concentration of product in the emulsion is not reduced when the additional parts of dispersed phase are added.

2. The method according to claim 1, wherein the components from the whole-cell biotransformation are selected from the group consisting of cells, soluble cell components, organic solvents, water, and combinations thereof.

3. The method according to claim 1, wherein the dispersed phase is an organic phase.

4. The method according to claim 1, wherein the stable emulsion in the mixture is an oil-in-water emulsion and during the catastrophic phase inversion, the oil-in-water emulsion that was originally present is converted to a water-in oil emulsion.

5. The method according to claim 1, wherein the stable emulsion in the mixture is a water-in-oil emulsion and during the catastrophic phase inversion, the water-in-oil emulsion that was originally present is converted to an oil-in-water emulsion.

6. The method according to claim 1, further comprising selecting a phase ratio of the stable emulsion and the dispersed phase added to the stable emulsion effective to achieve the catastrophic phase inversion, wherein the selection is based on type and concentration of components from the biotransformation present in the stable emulsion.

7. The method according to claim 1, wherein the amount of the dispersed phase added to the stable emulsion effective to achieve the catastrophic phase inversion is in a range of between 1 part stable emulsion to 1 part dispersed phase and 1 part stable emulsion to 8 parts dispersed phase.

8. The method according to claim 7, wherein the dispersed phase is an organic phase and the stable emulsion is mixed with 4 to 5 parts of the organic phase.

9. The method according to claim 7, wherein the dispersed phase is an organic phase and the stable emulsion is mixed with 4 parts of the organic phase.

10. The method according to claim 1, wherein the dispersed phase is an organic phase, and wherein a sharp phase separation of the phase-inverted mixture occurs after step d).

11. The method according to claim 1, further comprising, subsequent to step d):
   e) drawing off the phase corresponding to the originally dispersed phase from the settling container.

12. The method according to claim 11, wherein the phase corresponding to the originally dispersed phase is at least partly recycled as being the dispersed phase added in b) in processing of subsequent stable emulsions.

13. The method according to claim 12, wherein the phase corresponding to the originally dispersed phase is separated into 4 or 5 parts, and
   wherein 4 to 5 parts of the phase corresponding to the originally dispersed phase are partly recycled.

14. The method according to claim 11, further comprising, subsequent to step e):
   f) subjecting at least a part of the phase corresponding to the originally dispersed phase drawn off from the settling container to further purification in order to isolate the at least one product therefrom.

15. The method according to claim 14, wherein the phase corresponding to the originally dispersed phase is separated into from 1 to 5 parts, and
wherein 1 to 5 parts of the phase corresponding to the originally dispersed phase are subjected to further purification.

16. The method according to claim 1, wherein the phase-inverted mixture comprises an aqueous phase with cells from the whole-cell biotransformation and wherein the method further comprise, subsequent to d):
removing at least a portion of the cell-containing aqueous phase from a lower end of the settling container.

17. The method according to claim 1, wherein the phase-inverted mixture is continuously transferred to the settling container until the settling container is filled.

18. The method according to claim 1, wherein the phase ratio of the mixture of b) does not need to be maintained precisely.

* * * * *